United States Patent
Yang et al.

(10) Patent No.: US 9,503,272 B2
(45) Date of Patent: Nov. 22, 2016

(54) FAST CONVERGENCE WITH MULTICAST SOURCE MOBILITY

(71) Applicant: CISCO TECHNOLOGY, INC., San Jose, CA (US)

(72) Inventors: Fang Yang, Shanghai (CN); Kathy Xia Ke, Shanghai (CN); Isidoros Kouvelas, Halandri (GR); Christian Cassar, Hampton (GB)

(73) Assignee: Cisco Technology, Inc., San Jose, CA (US)

( * ) Notice: Subject to any disclaimer, the term of this patent is extended or adjusted under 35 U.S.C. 154(b) by 240 days.

(21) Appl. No.: 14/209,744

(22) Filed: Mar. 13, 2014

(65) Prior Publication Data

US 2015/0263864 A1   Sep. 17, 2015

(51) Int. Cl.
*H04L 12/56* (2006.01)
*H04L 12/18* (2006.01)

(52) U.S. Cl.
CPC .................. *H04L 12/185* (2013.01)

(58) Field of Classification Search
CPC .... H04L 12/18; H04L 12/185; H04L 12/189
See application file for complete search history.

(56) References Cited

U.S. PATENT DOCUMENTS

| | | |
|---|---|---|
| 6,856,991 B1 | 2/2005 | Srivastava |
| 7,159,034 B1 | 1/2007 | Rai |
| 7,447,203 B2 | 11/2008 | Chen et al. |
| 7,483,387 B2 | 1/2009 | Guichard et al. |
| 7,664,133 B2 | 2/2010 | Nichols |
| 7,814,542 B1 | 10/2010 | Day |
| 7,849,217 B2 | 12/2010 | Meier |
| 7,948,927 B2 | 5/2011 | Yoneda |
| 7,979,693 B2 | 7/2011 | Iida et al. |
| 2001/0044842 A1 | 11/2001 | Kawakami |
| 2002/0001288 A1 | 1/2002 | Fukunaga et al. |
| 2002/0026489 A1 | 2/2002 | Homma |
| 2011/0202761 A1* | 8/2011 | Sarela ............... H04L 12/189 713/163 |
| 2012/0269111 A1* | 10/2012 | Um ................... H04L 12/189 370/312 |
| 2013/0279397 A1* | 10/2013 | Hui ................... H04W 36/026 370/312 |
| 2014/0198706 A1* | 7/2014 | Jung ................. H04L 12/1877 370/312 |
| 2014/0297875 A1* | 10/2014 | Cheng ............... H04L 61/103 709/226 |
| 2015/0358226 A1* | 12/2015 | Liu ................... H04L 12/18 370/390 |

OTHER PUBLICATIONS

Cisco Segmented Generalized Multiprotocol Label Switching for the IP Next-Generation Network (1992-2006 Cisco Systems, Inc.).

* cited by examiner

*Primary Examiner* — Shaq Taha
(74) *Attorney, Agent, or Firm* — Cindy Kaplan

(57) ABSTRACT

In one embodiment, a method includes discovering at a first edge device in a first network that a multicast source has moved from the first network to a second network, the first edge device in communication through a core network with a plurality of edge devices belonging to a multicast group comprising the multicast source, transmitting from the first edge device to a second edge device in the second network, a join request for the multicast group comprising the multicast source at the second network, receiving multicast traffic for the multicast group at the first edge device on a transient multicast tree extending from the second edge device to the plurality of edge devices, and forwarding the multicast traffic to the plurality of edge devices. An apparatus and logic are also disclosed herein.

20 Claims, 6 Drawing Sheets

FAST CONVERGENCE WITH MULTICAST SOURCE MOBILITY

TECHNICAL FIELD

The present disclosure relates generally to communication networks, and more particularly, to fast convergence in a communication network.

BACKGROUND

The increasing use of virtualization in networks has enabled a great amount of flexibility in managing servers and workloads. One important aspect of this flexibility is mobility. As workloads are hosted on virtual servers, they are decoupled from the physical infrastructure and become mobile. As endpoints become detached from the physical infrastructure and are mobile, the routing infrastructure needs to evolve from a topology centric addressing model to a more flexible architecture.

BRIEF DESCRIPTION OF THE DRAWINGS

Corresponding reference characters indicate corresponding parts throughout the several views of the drawings.

DESCRIPTION OF EXAMPLE EMBODIMENTS

Overview

Figure 1:
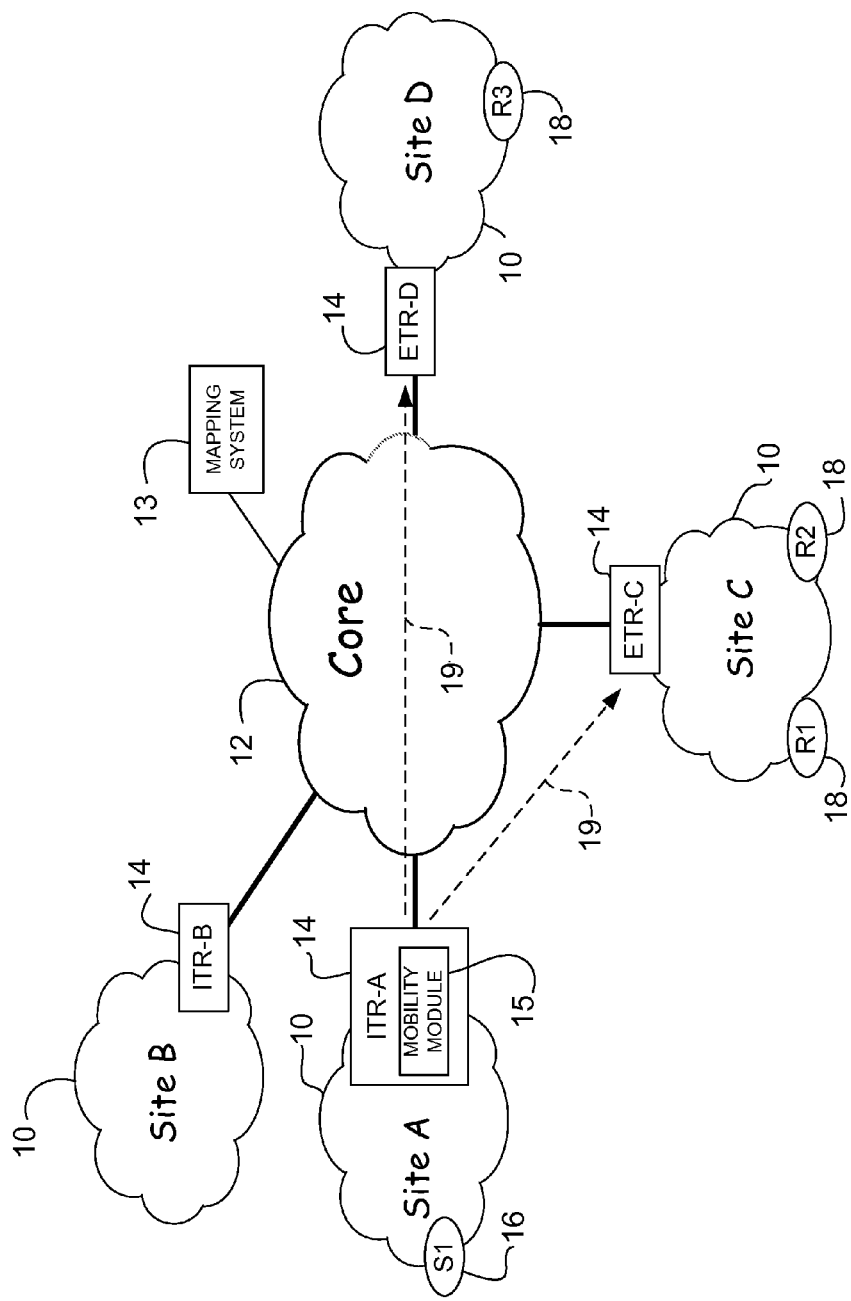
FIG. 1 illustrates an example of a network in which embodiments described herein may be implemented.

In one embodiment, a method generally comprises discovering at a first edge device in a first network that a multicast source has moved from the first network to a second network, the first edge device in communication through a core network with a plurality of edge devices belonging to a multicast group comprising the multicast source, transmitting from the first edge device to a second edge device in the second network, a join request for the multicast group comprising the multicast source at the second network, receiving multicast traffic for the multicast group at the first edge device on a transient multicast tree extending from the second edge device to the plurality of edge devices, and forwarding the multicast traffic to the plurality of edge devices.

In another embodiment, an apparatus generally comprises a processor for processing packets at a first edge device in a first network in communication through a core network with a plurality of edge devices belonging to a multicast group comprising a multicast source, and in response to discovering that the multicast source has moved from the first network to a second network, transmitting to a second edge device in the second network a join request for the multicast group comprising the multicast source at the second network. The processor is further configured for forwarding multicast traffic for the multicast group on a transient multicast tree extending from the second edge device to the plurality of edge devices. The apparatus further comprises memory for storing endpoint identifier to routing location mappings.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

Locator Identifier Separation Protocol (LISP) is an example of a protocol that uses routing locators and endpoint identifiers to improve the scalability of a routing system. The LISP architecture provides a mechanism to separate out identification and location semantics from the current definition of an IP address. IP address semantics are extended to incorporate a distinction between routing locators (RLOCs) for routing through core networks and endpoint identifiers (EIDs) for identifying network sessions between devices.

LISP multicast allows source multicast sites and receiver multicast sites to send and receive multicast packets over a unicast RLOC core and keeps the EID state out of the core network. LISP multicast may be implemented using a unicast headend replication or multicast replication mode. In unicast headend replication mode, multicast is implemented in LISP sites, but not implemented in the core network, or exploited if deployed. For example, if an ingress tunnel router (ITR) receives a multicast packet from a LISP site and needs to forward the multicast packet to multiple other LISP sites, the ITR needs to replicate multicast packets for each receiving LISP site and encapsulate the multicast packet within a header with a unicast destination. In conventional LISP multicast networks using unicast headend replication with PIM-SSM (Protocol Independent Multicast-Source Specific Multicast) mode, multicast traffic is dropped in the period starting when a source host moves between LISP sites, through the map cache entries being updated at xTRs connecting the receiving LISP sites, and the resulting control plane PIM join updates to the source host's new home.

The embodiments described herein provide fast convergence for multicast source mobility to prevent multicast packet loss. The embodiments may be implemented, for example, in LISP multicast to provide improved scalability in large networks. It is to be understood that LISP is used herein as an example and that other protocols that provide a locator/identifier split or map and encapsulation may be used, without departing from the scope of the embodiments.

Referring now to the drawings, and first to FIG. 1, an example of a network in which embodiments described herein may be implemented is shown. For simplification, only a small number of nodes are shown. In the example of FIG. 1, four networks (network sites) 10 (site A, site B, site C, and site D) are in communication through a core network 12. The network sites 10 may belong to one or more virtual private networks (VPNs). The core network 12 may be, for example, an L2 metro Ethernet core, L3 IP network core, MPLS core, or any other type of network.

Each network 10, 12 may include any number of edge devices or intermediate (core) nodes (e.g., routers, switches, access layer devices, aggregation layer devices, gateways, or other network devices), which facilitate passage of data within the network. As shown in the example of FIG. 1, each network site 10 includes an edge device 14 configured to perform xTR (ingress tunnel router (ITR)/egress tunnel router (ETR)) functions. The edge devices 14 may be routers, switches, or other network devices configured to perform forwarding functions (e.g., L2, L3, or L2/L3 devices).

In one embodiment, the xTRs 14 are configured for operation in accordance with LISP. As previously described, LISP creates two address (name) spaces; endpoint identifiers (EIDs), which are assigned to endpoints, and routing locators (RLOCs), which are assigned to devices to indicate the location within the network topology. EID reachability across LISP sites 10 is achieved by resolving EID-to-RLOC mappings. Reachability within the RLOC space (core network 12) is achieved by traditional routing methods.

In the example shown in FIG. 1, the edge devices 14 in sites A and B (ITR-A and ITR-B) operate as ingress tunnel routers (ITRs) and the edge devices in sites C and D (ETR-C and ETR-D) operate as egress tunnel routers (ETRs). The ITR accepts IP packets from site end systems on one side and sends encapsulated packets on the other side. The ITR accepts an IP packet with a single IP header and treats this inner IP destination address as an EID. The ITR performs an EID-RLOC mapping lookup if needed, and prepends an outer IP header with one of its RLOCs in the source address field and the result of the mapping lookup in the destination address field. The ETR receives encapsulated IP packets on one side and sends decapsulated IP packets to site end systems on the other side. The ETR accepts an IP packet where the destination address in the outer IP header is one of its own RLOCs and forwards the packet based on the next IP header.

The network also includes a mapping system 13. In one embodiment, the mapping system comprises a map server/map resolver (MS/MR). The map server implements the mapping database distribution by accepting registration requests from its client ETRs, aggregating the EID prefixes, and advertising the aggregated prefixes. The map resolver accepts encapsulated map-request messages sent by ITRs, decapsulates them, and then forwards them toward the ETRs responsible for the EIDs being requested. The mapping database is distributed among the ETRs at the LISP sites. Each ITR maintains a cache of the mapping database entries that it needs at a particular time. It is to be understood that the mapping system described herein is only an example and that other mapping systems may be used without departing from the scope of the invention.

In the example shown in FIG. 1, site A includes host S1 (16), site C includes receivers R1, R2 (18), and site D includes receiver R3. In one example, host S1 is an SSM multicast source located at a LISP network site. Hosts R1, R2, and R3 are receivers located at other LISP network sites. The receivers 18 join a multicast group G by sending a request (e.g., IGMPv3 (Internet Group Management Protocol version 3)) to their first hop routers and ETR-C (at site C) and ETR-D (at site D) send PIM joins (S1-EID, G) to ITR-A. S1-EID is the source host and G is the group address that the receivers join. When the PIM join reaches the first hop router of source host S1 in site A, a multicast tree 19 is formed between ITR-A and ETR-C, and ITR-A and ETR-D.

In one embodiment, the network operates in unicast headend replication with PIM-SSM mode. In unicast headed replication mode, multicast is implemented in network sites 10, but not implemented in the core network 12. If one of the ITR nodes 14 receives a multicast packet from the network site 10 and needs to forward the multicast packet to multiple other LISP sites, the ITR 14 needs to replicate the multicast packet for each receiving LISP site and encapsulate the multicast packet within a unicast header. For example, if ITR-A receives a multicast packet from multicast source S1 and needs to forward the packet to ETR-C and ETR-D, ITR-A replicates the packet twice, encapsulates the packet in a unicast packet, and sends the packet to ETR-C and ETR-D, respectively.

With multicast source mobility, source S1 may move between network sites 10. In one example, multicast source S1 moves from site A to site B. ITR-A discovers that host S1 has moved out of site A and is reachable at site B. ITR-A may discover that S1 has moved by various means. For example, ITR-B may detect that the host has moved, and notify the map server/map resolver (MS/MR) 13 about the change. MS/MR 13 may then notify ITR-A that host S1 has moved to site B. In conventional networks, at least five control plane messages (SMR (Solicit-Map-Request), Map-Request, Map-Reply, PIM prune, PIM join) are needed for each downstream xTR to complete a new multicast tree. For example, ITR-A needs to send an SMR to all downstream xTRs (ETR-C, ETR-D) to notify the xTRs of host S1's location change. ETR-C and ETR-D then need to send PIM joins to ITR-B to set up a multicast tree between xTRs, and send prunes to ITR-A. After receiving the first PIM join, ITR-B sends a PIM join to the first hop router of S1 to set up the multicast tree in site B. These control plane messages may consume a large amount of resources and time, especially in large scale networks with thousands of receivers.

In one embodiment, the existing multicast tree between the original source xTR and its downstream xTR is leveraged by extending the multicast tree towards the new source xTR of the site that the multicast source has moved to, until the new multicast source trees are set up from the receiving xTRs directly to the new source xTR. The embodiments therefore reduce the traffic outage time for multicast receivers when a mobile multicast source moves between network sites.

Referring again to FIG. 1, ITR-A includes a mobility module 15 operable to set up a transient multicast tree by extending the existing multicast tree 19 towards the new multicast source location to reduce multicast packet drop during the period between a source move and the set up of new source trees from receiving xTRs directly to the new source xTR.

In the example shown in FIG. 1, only ITR-A is shown with a mobility module 15, however, any of the xTRs may include a mobility module to provide fast convergence following migration of a source in the xTR's network site. As described below with respect to FIG. 2, the mobility module 15 may comprise code, logic, or any other mechanism operable to perform the functions described herein.

It is to be understood that the network shown in FIG. 1 is only an example and the embodiments described herein may be implemented in networks comprising different network topologies or network devices, without departing from the scope of the embodiments. For example, there may be any number of network sites 10 in communication with any number of core networks. Also, each network site may include any number of xTRs, sources, or receivers. As previously noted, the xTRs are configured to operate in a LISP architecture.

Figure 2:
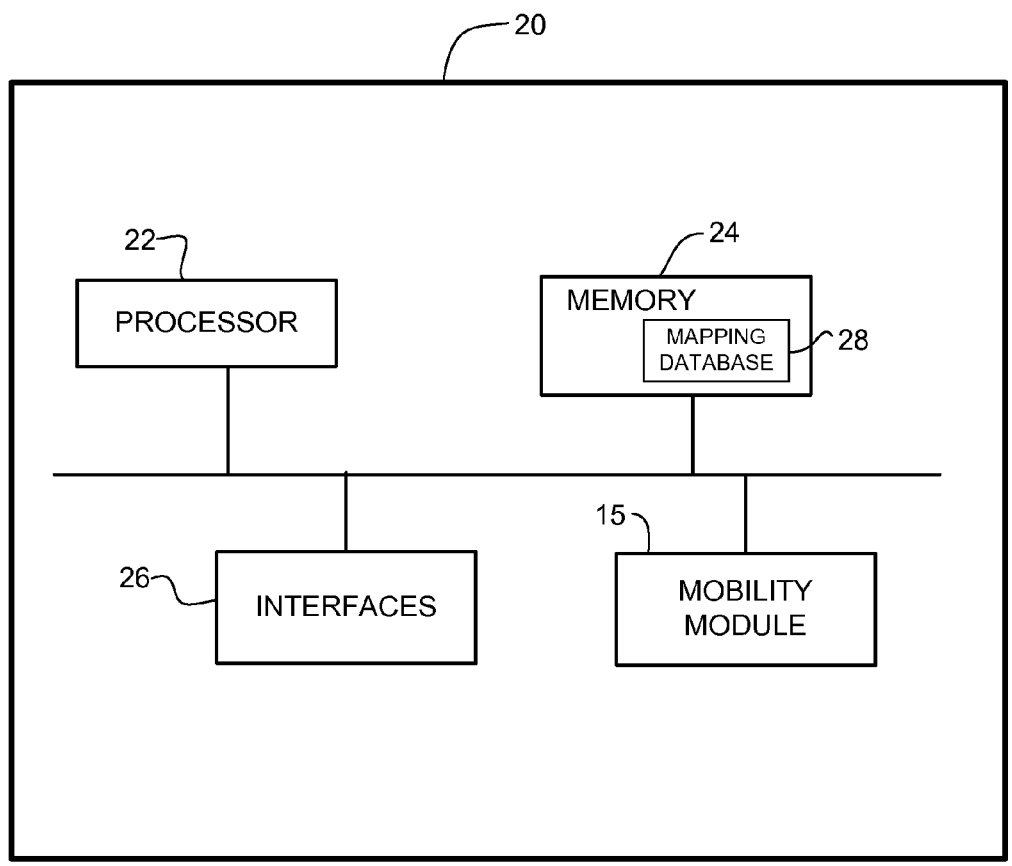
FIG. 2 depicts an example of a network device useful in implementing embodiments described herein.

FIG. 2 illustrates an example of a network device 20 (e.g., xTR) that may be used to implement the embodiments described herein. In one embodiment, the network device is a programmable machine that may be implemented in hardware, software, or any combination thereof. The network device 20 includes one or more processor 22, memory 24, network interfaces 26, and mobility module 15.

Memory 24 may be a volatile memory or non-volatile storage, which stores various applications, operating systems, modules, and data for execution and use by the processor 22. Memory 24 may include a mapping database 28, which comprises a cache of mapping database entries (e.g., EID-to-RLOC mappings). Mobility module 15 (e.g., code, logic, software, etc.) may also be stored in memory 24. The device 20 may include any number of memory components.

Logic may be encoded in one or more tangible media for execution by the processor 22. For example, the processor 22 may execute codes stored in a computer-readable medium such as memory 24. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium. In one example, the computer-readable medium comprises a non-transitory computer-readable medium. The network device 20 may include any number of processors 22.

The network interfaces 26 may comprise any number of interfaces (linecards, ports) for receiving data or transmitting data to other devices. The network interface may include, for example, an Ethernet interface for connection to a computer or network.

It is to be understood that the network device 20 shown in FIG. 2 and described above is only an example and that different configurations of network devices may be used. For example, the network device 20 may further include any suitable combination of hardware, software, algorithms, processors, devices, components, or elements operable to facilitate the capabilities described herein.

Figure 3:
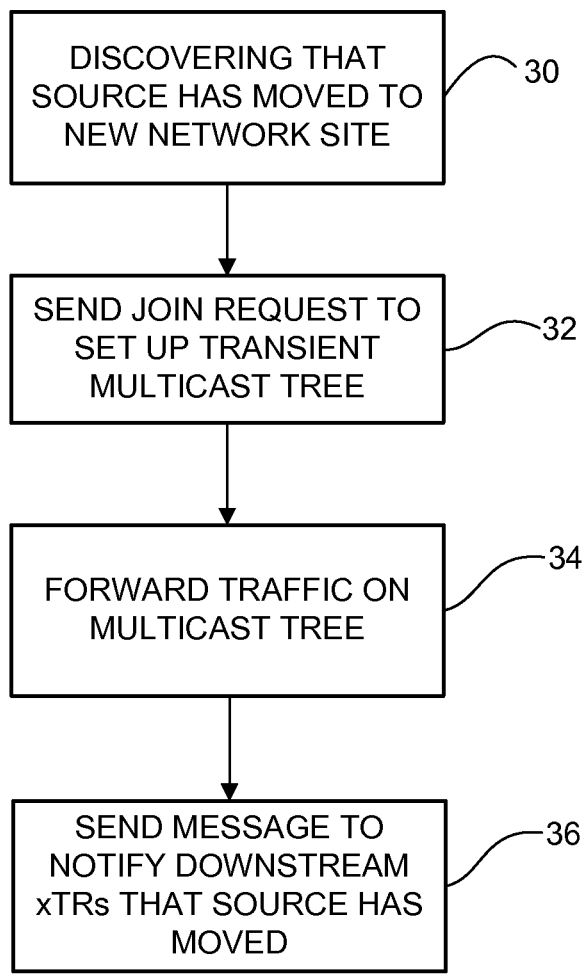
FIG. 3 is a flowchart illustrating a process for fast convergence with multicast source mobility, in accordance with one embodiment.
Figure 4:
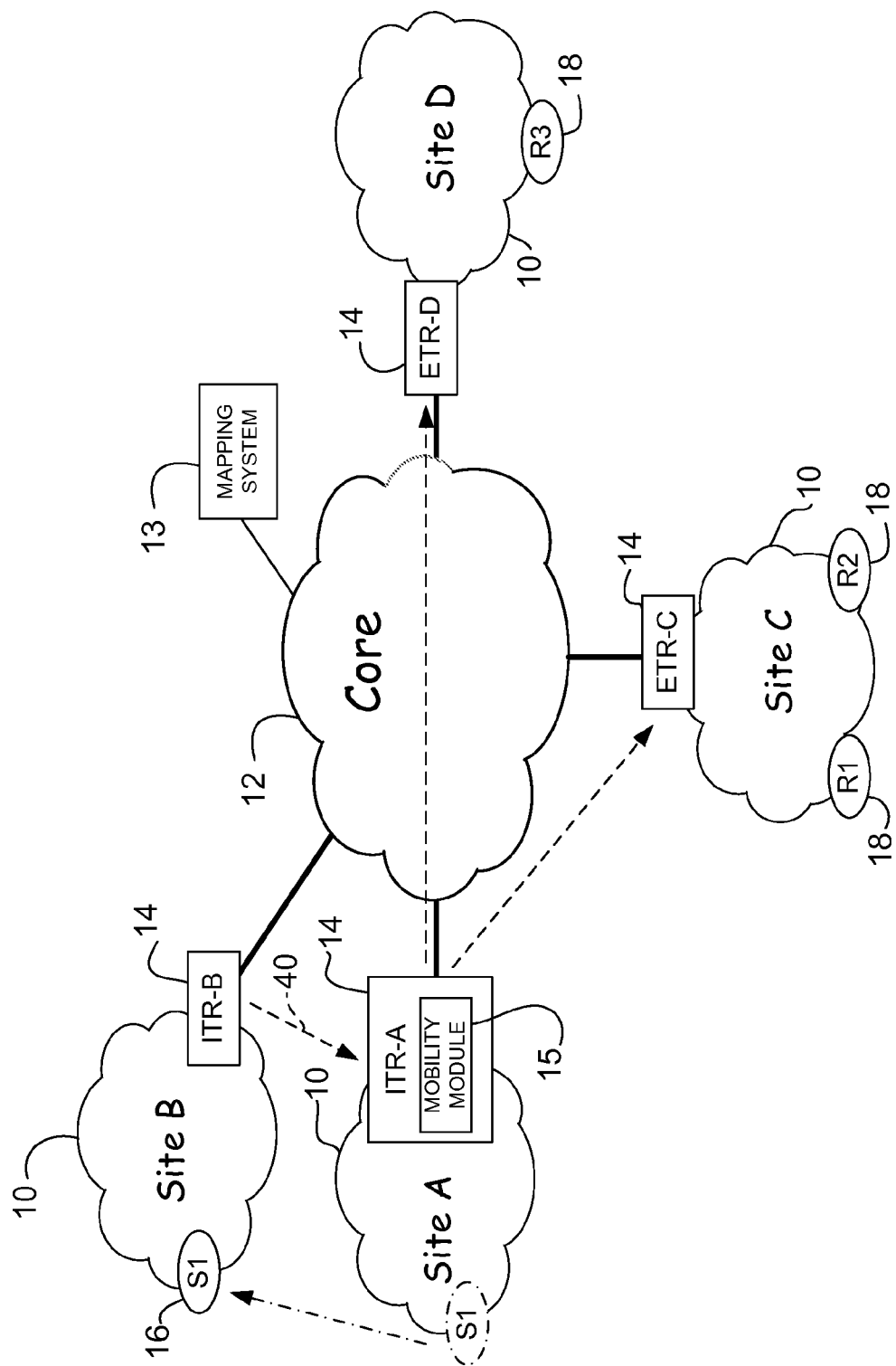
FIG. 4 illustrates an example of a transient multicast tree in the network of FIG. 1 following migration of a multicast source between network sites.

FIG. 3 is a flowchart illustrating an overview of a process for fast convergence with multicast source mobility, in accordance with one embodiment. At step 30, an ingress tunnel router (e.g., ITR-A) discovers (learns) that a host source (S1) that was previously located in the same network site (site A) has moved to a new network site (site B) (as shown in FIG. 4). ITR-A may, for example, receive a notification indicating that host S1 has moved to site B. ITR-A sends a PIM join request to the new site (site B) to set up a transient multicast tree 40 between xTRs (step 32) (FIGS. 3 and 4). After receiving the join from ITR-A, ITR-B sends a join request to the first hop router of S1 to set up the multicast tree in site B. The full multicast tree is then set up from ITR-B over ITR-A to all downstream ETRs. ITR-A forwards multicast traffic over the transient multicast tree (step 34). This minimizes multicast packet drop during the transition. ITR-A also sends a message (e.g., SMR) to all downstream xTRs (ETR-C, ETR-D) to notify them that host S1 has changed locations (step 36). As described below, the ETRs will set up a new multicast tree between the xTRs. After the new multicast tree is formed for all xTRs, ITR-A may send prune message to ITR-B to remove the transient multicast tree.

It is to be understood that the process shown in FIG. 3 and described above is only an example and that steps may be added or modified without departing from the scope of the embodiments.

FIG. 4 illustrates the transient multicast tree 40 set up between xTRs following the move of source S1 from site A to site B and before the new multicast source trees are completely set up from receiving xTRs directly to the new source xTR.

In one example illustrating how ITR-A learns about the migration of source S1 to site B, ITR-B detects that a new host S1 has moved into site B. ITR-B notifies MS/MR by MAP-Register to register host S1 in site B. The MS/MR notifies ITR-A that host S1 has moved to site B. It is to be understood that this is only an example and other mechanisms/methods may be used for ITR-A to learn that source S1 has moved.

Upon discovering that source S1 has moved, the mobility module 15 sends PIM join (S1-EID, G) to the new site ITR-B in order to set up the transient multicast tree 40 between xTRs. Even for a large multicast network, after ITR-A is notified that source host S1 has moved, only a single PIM join message (S1-EID, G) needs to be sent out to new location (ITR-B) to create the transient multicast tree, thereby reducing packet drop rate.

After receiving the PIM join (S1-EID, G) from ITR-A, ITR-B sends PIM join (S1-EID, G) to the first hop router of S1 to set up the multicast tree in site B. The full multicast tree is then set up from ITR-B over ITR-A to all downstream ITRs. The multicast traffic is forwarded over the transient multicast tree to reduce multicast packet drop.

In one embodiment, ITR-A sends an SMR to all downstream xTRs (ETR-C, ETR-D), to notify them that host S1's location has changed. Upon receiving the SMR, ETR-C and ETR-D clear their local (S1-EID, ITR-A-RLOC) cache and send a MAP-Request to the MS/MR 13 to get the new location of S1-EID.

Once ETR-C and ETR-D set the new location (ITR-B in this example), ETR-C and ETR-D send PIM joins (S1-EID, G) to ITR-B to set up the multicast tree between xTRs. In the meantime, those downstream ETRs may send PIM prune messages to ITR-A.

Figure 5:
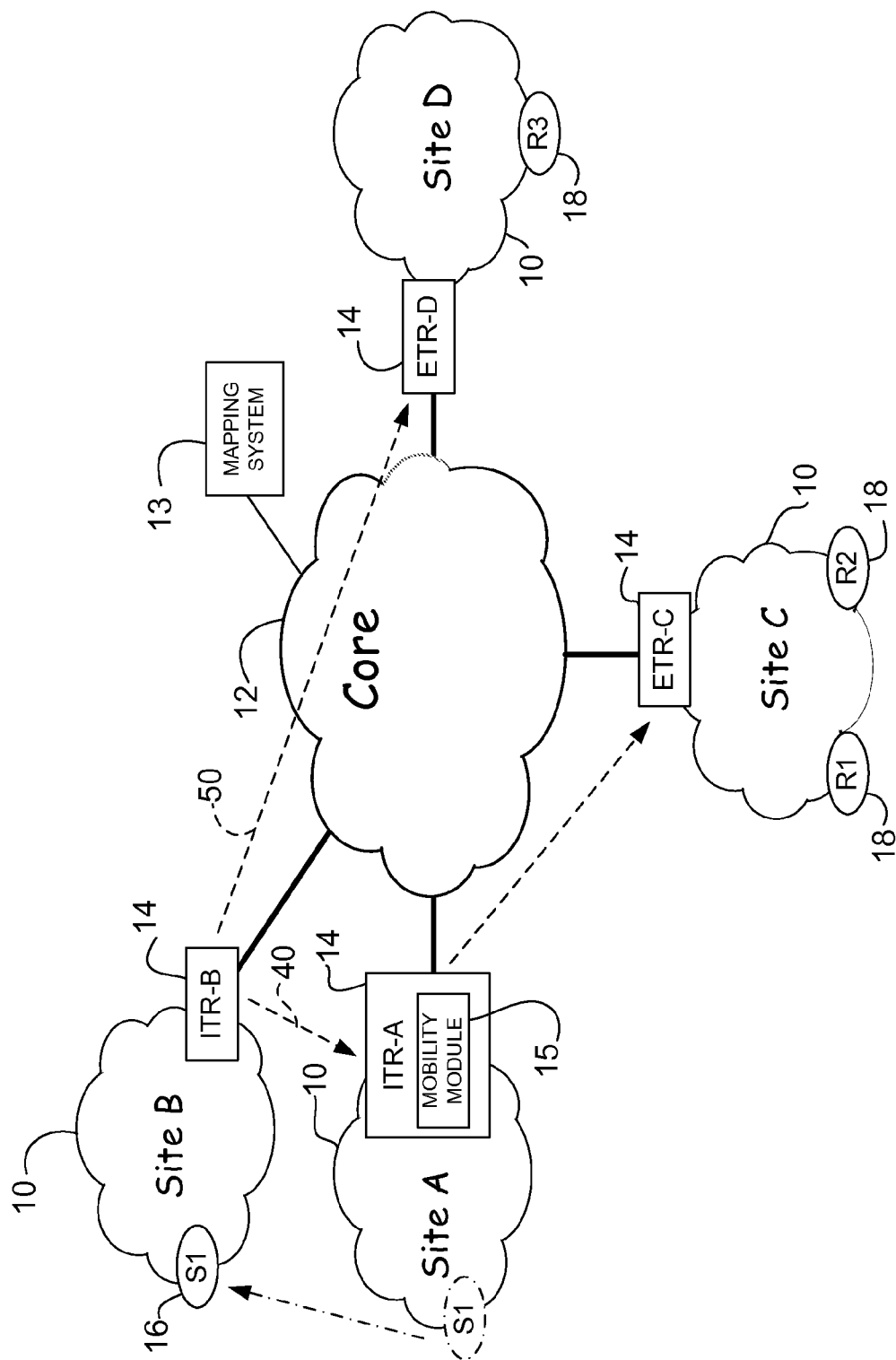
FIG. 5 illustrates the multicast tree after one egress tunnel router has set up a new multicast tree for the new source location.

The clearing of the local cache and transmitting of prune messages take place on each downstream xTR independently. Thus, one of the xTRs may complete these steps before another, as shown in the example of FIG. 5. FIG. 5 illustrates multicast trees 40, 50 after ETR-D completes the update procedure, and ETR-C has not yet completed the update procedure.

Figure 6:
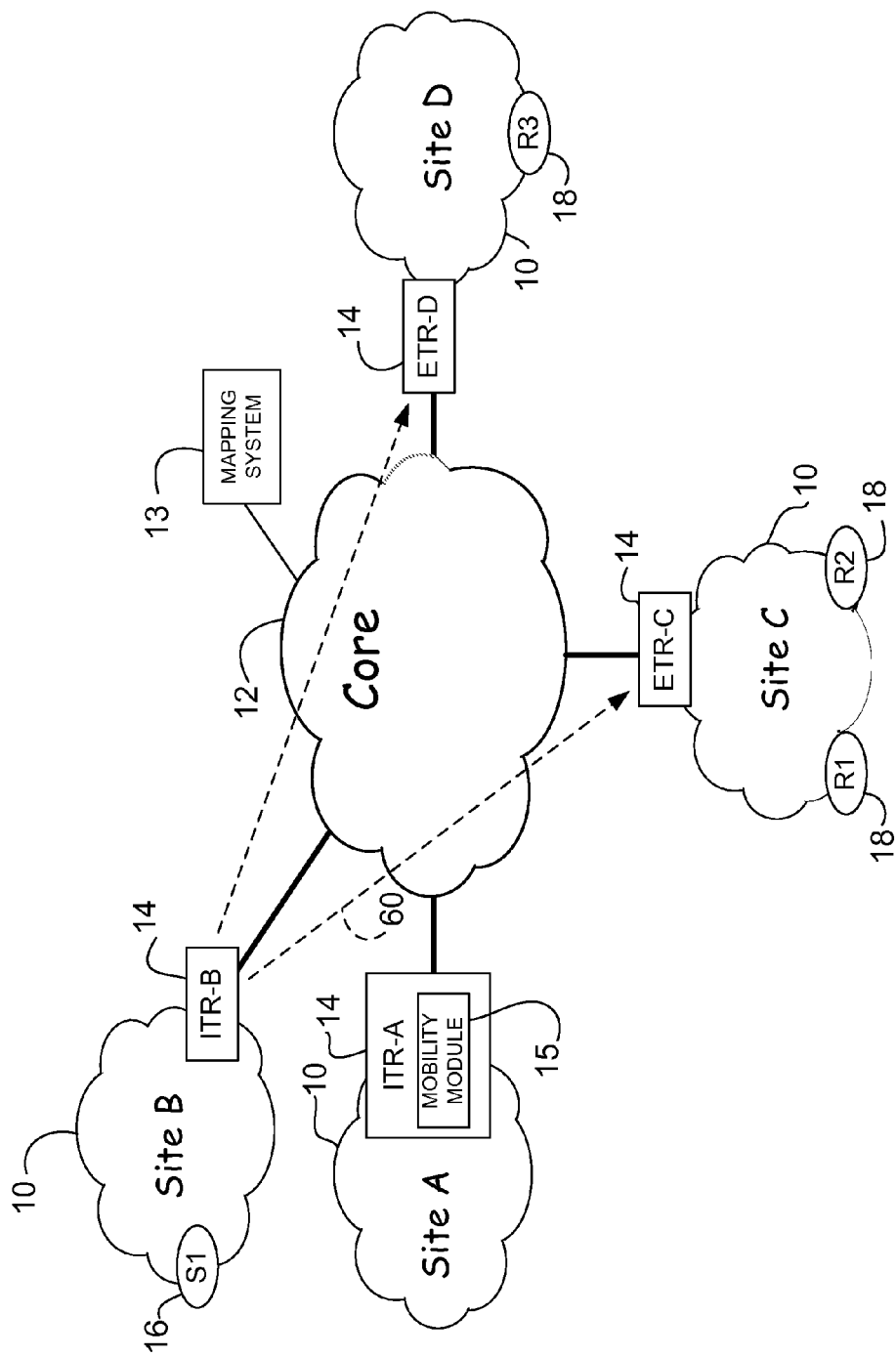
FIG. 6 illustrates the multicast tree after both egress tunnel routers have set up new multicast trees.

After all downstream XTRs complete their update, ITR-A may send a PIM prune to ITR-B. The final multicast tree 60 is shown in FIG. 6.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:
1. A method comprising:
discovering at a first edge device in a first network that a multicast source has moved from said first network to a second network, said first edge device in communi- cation through a core network with a plurality of edge devices belonging to a multicast group comprising the multicast source;

transmitting from said first edge device to a second edge device in said second network, a join request for the multicast group comprising the multicast source at said second network to create a transient multicast tree between said second edge device and said first edge device;

receiving multicast traffic for the multicast group at said first edge device on said transient multicast tree extending from said second edge device to said plurality of edge devices; and forwarding the multicast traffic from said first edge device to said plurality of edge devices;

wherein said multicast traffic is received on said transient multicast tree until a new multicast tree is formed at said second edge device.

2. The method of claim 1 further comprising transmitting a message to said plurality of edge devices to notify said plurality of edge devices that the multicast source has moved from said first network to said second network.

3. The method of claim 2 wherein said message comprises a Locator Identifier Separation Protocol (LISP) solicit map request.

4. The method of claim 1 wherein discovering that the multicast source has moved comprises receiving a notification.

5. The method of claim 1 further comprising receiving a prune message from one of said plurality of edge devices and continuing to forward the multicast traffic to other of said plurality of edge devices.

6. The method of claim 1 further comprising receiving a prune message from all of said plurality of edge devices and transmitting a prune message to said second edge device to remove said transient multicast tree.

7. The method of claim 1 wherein said plurality of edge devices comprise LISP (Locator Identifier Separation Protocol) egress tunnel routers and said first and second edge devices comprise LISP ingress tunnel routers.

8. The method of claim 1 wherein said join message comprises a PIM (Protocol Independent Multicast) join request.

9. The method of claim 1 wherein said first edge device operates in unicast headend replication with PIM-SSM (Protocol Independent Multicast-Source Specific Multicast) mode.

10. An apparatus comprising:
a processor for:
processing packets at a first edge device in a first network in communication through a core network with a plurality of edge devices belonging to a multicast group comprising a multicast source;
in response to discovering that the multicast source has moved from said first network to a second network, transmitting to a second edge device in said second network a join request for the multicast group comprising the multicast source at said second network to create a transient multicast tree between said second edge device and said first edge device; and
forwarding multicast traffic for the multicast group on said transient multicast tree extending from said second edge device to said plurality of edge devices; and memory for storing endpoint identifier to routing location mappings;
wherein said multicast traffic is received on said transient multicast tree until a new multicast tree is formed at said second edge device.

11. The apparatus of claim 10 wherein the processor is further configured for transmitting a message to said plurality of edge devices to notify said plurality of edge devices that the multicast source has moved from said first network to said second network.

12. The apparatus of claim 10 wherein discovering that the multicast source has moved comprises receiving a notification.

13. The apparatus of claim 10 wherein the processor is further configured for receiving a prune message from one of said plurality of edge devices and continuing to forward the multicast traffic to other of said plurality of edge devices.

14. The apparatus of claim 10 wherein the processor is further configured for receiving a prune message from all of said plurality of edge devices and transmitting a prune message to said second edge device to remove said transient multicast tree.

15. The apparatus of claim 10 wherein said plurality of edge devices comprise LISP (Locator Identifier Separation Protocol) egress tunnel routers and said first and second edge devices comprise LISP ingress tunnel routers.

16. The apparatus of claim 10 wherein said join message comprises a PIM (Protocol Independent Multicast) join request.

17. The apparatus of claim 10 wherein said first edge device operates in unicast headend replication with PIM-SSM (Protocol Independent Multicast-Source Specific Multicast) mode.

18. Logic encoded on one or more non-transitory computer readable media for execution and when executed operable to:
discover at a first edge device in a first network that a multicast source has moved from said first network to a second network, said first edge device operable for communication through a core network with a plurality of edge devices belonging to a multicast group comprising the multicast source;
transmit to a second edge device in said second network, a join request for the multicast group comprising the multicast source at said second network to create a transient multicast tree between said second edge device and said first edge device; and
forward multicast traffic received from said second edge device for the multicast group on said transient multicast tree extending from said second edge device to said plurality of edge devices;
wherein said multicast traffic is received on said transient multicast tree until a new multicast tree is formed at said second edge device.

19. The logic of claim 18 further operable to receive a prune message from one of said plurality of edge devices and continue to forward the multicast traffic to other of said plurality of edge devices.

20. The logic of claim 18 wherein said plurality of edge devices comprise LISP (Locator Identifier Separation Protocol) egress tunnel routers and said first and second edge devices comprise LISP ingress tunnel routers.

* * * * *